(12) United States Patent
Murthy et al.

(10) Patent No.: US 8,009,775 B2
(45) Date of Patent: Aug. 30, 2011

(54) AUTOMATIC FREQUENCY CONTROL FOR A WIRELESS COMMUNICATION SYSTEM WITH MULTIPLE SUBCARRIERS

(75) Inventors: Vinay Murthy, San Diego, CA (US); Alok Kumar Gupta, Encinitas, CA (US); Seong Taek Chung, Redwood City, CA (US); Fuyun Ling, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1159 days.

(21) Appl. No.: 11/372,931

(22) Filed: Mar. 9, 2006

(65) Prior Publication Data
US 2006/0215778 A1   Sep. 28, 2006

Related U.S. Application Data

(60) Provisional application No. 60/660,914, filed on Mar. 11, 2005.

(51) Int. Cl.
*H04L 27/06* (2006.01)
*H04L 7/00* (2006.01)
*H04L 27/00* (2006.01)

(52) U.S. Cl. ......... 375/344; 375/354; 375/324; 375/326

(58) Field of Classification Search ........... 375/240.26–240.29, 285, 293, 375/302, 271, 322, 326, 324, 338, 339, 344, 375/345, 346, 347, 355, 359, 362, 364, 371, 375/375, 376, 354
See application file for complete search history.

(56) References Cited

U.S. PATENT DOCUMENTS

| | | | |
|---|---|---|---|
| 4,438,511 A | 3/1984 | Baran | |
| 4,715,001 A | 12/1987 | Deem et al. | |
| 5,151,926 A | 9/1992 | Chennakeshu et al. | |
| 5,504,453 A | 4/1996 | MacDonald et al. | |
| 5,692,016 A | 11/1997 | Vanselow | |

(Continued)

FOREIGN PATENT DOCUMENTS

EP   0729250   8/1996

(Continued)

OTHER PUBLICATIONS

International Search Report, PCT/US2006/009475, International Searching Authority, European Patent Office, Apr. 6, 2008.

(Continued)

*Primary Examiner* — Dac V Ha
*Assistant Examiner* — Linda Wong
(74) *Attorney, Agent, or Firm* — Ryan N. Farr

(57) ABSTRACT

Techniques for performing frequency control in an OFDM system are described. In one aspect, frequency acquisition is performed based on a received pilot, and frequency tracking is performed based on received OFDM symbols. For frequency acquisition, an initial frequency error estimate may be derived based on the received pilot, and an automatic frequency control (AFC) loop may be initialized with the initial frequency error estimate. For frequency tracking, a frequency error estimate may be derived for each received OFDM symbol, and the AFC loop may be updated with the frequency error estimate. Frequency error in input samples is corrected by the AFC loop with the initial frequency error estimate as well as the frequency error estimate for each received OFDM symbol. In another aspect, a variable number of samples of a received OFDM symbol are selected, e.g., based on the received OFDM symbol timing, for use for frequency error estimation.

40 Claims, 10 Drawing Sheets

U.S. PATENT DOCUMENTS

| | | |
|---|---|---|
| 5,940,450 A | 8/1999 | Koslov et al. |
| 6,064,270 A | 5/2000 | Douglas |
| 6,163,710 A | 12/2000 | Blaser et al. |
| 6,226,505 B1 | 5/2001 | Uda |
| 6,424,826 B1 | 7/2002 | Horton et al. |
| 6,463,266 B1 | 10/2002 | Shohara |
| 6,470,367 B1 | 10/2002 | Yeh et al. |
| 6,522,696 B1 | 2/2003 | Mobin et al. |
| 6,760,573 B2 | 7/2004 | Subrahmanya et al. |
| 6,847,688 B1 | 1/2005 | Molnar et al. |
| 6,879,274 B2 | 4/2005 | Nestler et al. |
| 6,882,691 B2 | 4/2005 | Chiodini |
| 7,062,240 B2 | 6/2006 | Ballantyne et al. |
| 7,133,646 B1 | 11/2006 | Miao |
| 7,239,675 B2 | 7/2007 | Zehavi et al. |
| 7,289,765 B2 | 10/2007 | Okada et al. |
| 7,386,058 B2 | 6/2008 | Fujii |
| 7,443,826 B1 | 10/2008 | Atarius et al. |
| 7,444,240 B2 | 10/2008 | MacNeille et al. |
| 2003/0043768 A1 * | 3/2003 | Chang et al. ............... 370/335 |
| 2003/0053550 A1 * | 3/2003 | Peyla et al. ................ 375/267 |
| 2003/0068977 A1 | 4/2003 | King |
| 2003/0114110 A1 | 6/2003 | Dahlback et al. |
| 2004/0005018 A1 | 1/2004 | Zhu et al. |
| 2004/0005022 A1 * | 1/2004 | Zhu et al. ................... 375/365 |
| 2004/0009757 A1 | 1/2004 | Subrahmanya et al. |
| 2004/0132421 A1 | 7/2004 | Underbrink |
| 2004/0142701 A1 | 7/2004 | Abraham |
| 2004/0170238 A1 * | 9/2004 | Matsuyama et al. ........ 375/343 |
| 2004/0228272 A1 * | 11/2004 | Hasegawa et al. ............ 370/210 |
| 2005/0025264 A1 * | 2/2005 | Chen ............................ 375/346 |
| 2005/0163094 A1 * | 7/2005 | Okada et al. ................ 370/343 |
| 2005/0163238 A1 * | 7/2005 | Fujii ............................ 375/260 |
| 2005/0212697 A1 | 9/2005 | Brabec et al. |
| 2006/0140109 A1 * | 6/2006 | Lin .............................. 370/208 |
| 2007/0036231 A1 * | 2/2007 | Ido .............................. 375/260 |
| 2007/0147336 A1 * | 6/2007 | Lee et al. .................... 370/350 |

FOREIGN PATENT DOCUMENTS

| | | |
|---|---|---|
| EP | 0844764 A2 | 5/1998 |
| EP | 0847169 | 6/1998 |
| EP | 0940909 | 9/1999 |
| EP | 0959568 A1 | 11/1999 |
| EP | 0999676 | 5/2000 |
| EP | 1480363 A1 * | 11/2004 |
| JP | 2000165341 | 6/2000 |
| JP | 2004007280 | 1/2004 |
| JP | 2006507753 | 3/2006 |
| WO | 92016063 | 9/1992 |
| WO | 00033496 | 6/2000 |
| WO | WO03032542 A1 | 4/2003 |

OTHER PUBLICATIONS

Written Opinion, PCT/US2006/009475, International Searching Authority, European Patent Office, Apr. 6, 2008.

International Preliminary Report on Patentability, PCT/US2006/009475, The International Bureau of WIPO, Geneva, Switzerland, Jun. 18, 2008.

* cited by examiner

US 8,009,775 B2

AUTOMATIC FREQUENCY CONTROL FOR A WIRELESS COMMUNICATION SYSTEM WITH MULTIPLE SUBCARRIERS

The present application claims priority to provisional U.S. Application Ser. No. 60/660,914, entitled "Automatic Frequency Controller," filed Mar. 11, 2005, assigned to the assignee hereof and incorporated herein by reference.

BACKGROUND

I. Field

The present disclosure relates generally to communication, and more specifically to automatic frequency control (AFC) for wireless communication.

II. Background

In wireless communication, a transmitter modulates data onto a radio frequency (RF) carrier signal to generate an RF modulated signal that is more suitable for transmission. The transmitter then transmits the RF modulated signal via a wireless channel to a receiver. The transmitted signal may reach the receiver via one or more signal paths, which may include a line-of-sight path and/or reflected paths. The characteristics of the wireless channel may vary over time due to various phenomena such as fading and multipath. Consequently, the transmitted signal may experience different channel conditions and may be received with different amplitudes and/or phases over time.

The receiver receives the transmitted signal, downconverts the received signal with a local oscillator (LO) signal, and processes the downconverted signal to recover the data sent by the transmitter. The receiver typically performs frequency control (e.g., frequency acquisition and tracking) to estimate the frequency error in the LO signal and to correct this frequency error. This frequency error may be due to various factors such as receiver circuit component tolerances, temperature variations, and Doppler effect due to movement by the receiver and/or transmitter. The frequency control may be challenging if the requirements on frequency accuracy are stringent.

There is therefore a need in the art for techniques to expeditiously and reliably perform frequency control for wireless communication.

SUMMARY

Techniques for performing frequency control in a wireless communication system with multiple subcarriers are described herein. The multiple subcarriers may be obtained with Orthogonal Frequency Division Multiplexing (OFDM), Single-Carrier Frequency Division Multiple Access (SC-FDMA), or some other modulation technique.

In one aspect, techniques are described for performing frequency control in a system that transmits a pilot along with OFDM symbols. Frequency acquisition is performed based on a received pilot, which may be time division multiplexed with the OFDM symbols. Frequency tracking is performed based on received OFDM symbols. For frequency acquisition, an initial frequency error estimate may be derived based on the received pilot, and an automatic frequency control (AFC) loop may be initialized with the initial frequency error estimate. For frequency tracking, a frequency error estimate may be derived for each received OFDM symbol, and the AFC loop may be updated with the frequency error estimate. Frequency error in input samples is corrected by the AFC loop with the initial frequency error estimate as well as the frequency error estimate for each received OFDM symbol.

In another aspect, techniques are described for deriving a frequency error estimate for a received OFDM symbol. A variable number of samples of the received OFDM symbol are selected (e.g., based on the received OFDM symbol timing) for use for frequency error estimation. In an embodiment, the start of an FFT window is determined based on the timing of the received OFDM symbol. The samples to use for frequency error estimation are then selected from among the samples within the FFT window and for a cyclic prefix of the received OFDM symbol. A frequency error estimate is then derived based on the selected samples.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The frequency control techniques described herein may be used for various communication systems such as cellular systems, broadcast systems, wireless local area network (WLAN) systems, satellite positioning systems, and so on. The cellular systems may be Code Division Multiple Access (CDMA) systems, Time Division Multiple Access (TDMA) systems, Frequency Division Multiple Access (FDMA) systems, Orthogonal Frequency Division Multiple Access (OFDMA) systems, Single-Carrier FDMA (SC-FDMA) systems, and so on. The broadcast systems may be MediaFLO systems, Digital Video Broadcasting for Handhelds (DVB-H) systems, Integrated Services Digital Broadcasting for Terrestrial Television Broadcasting (ISDB-T) systems, and so on.

The WLAN systems may be IEEE 802.11 systems, Wi-Fi systems, and so on. These various systems are known in the art.

The frequency control techniques described herein may be used for systems with a single subcarrier as well as systems with multiple subcarriers. Multiple subcarriers may be obtained with OFDM, SC-FDMA, or some other modulation technique. OFDM and SC-FDMA partition a frequency band (e.g., the system bandwidth) into multiple (K) orthogonal subcarriers, which are also called tones, bins, and so on. Each subcarrier may be modulated with data. In general, modulation symbols are sent on the subcarriers in the frequency domain with OFDM and in the time domain with SC-FDMA. OFDM is used in various systems such as MediaFLO, DVB-H and ISDB-T broadcast systems, IEEE 802.11a/g WLAN systems, and some cellular systems. For clarity, the techniques are described below for a broadcast system that uses OFDM, e.g., a MediaFLO system.

Figure 1:
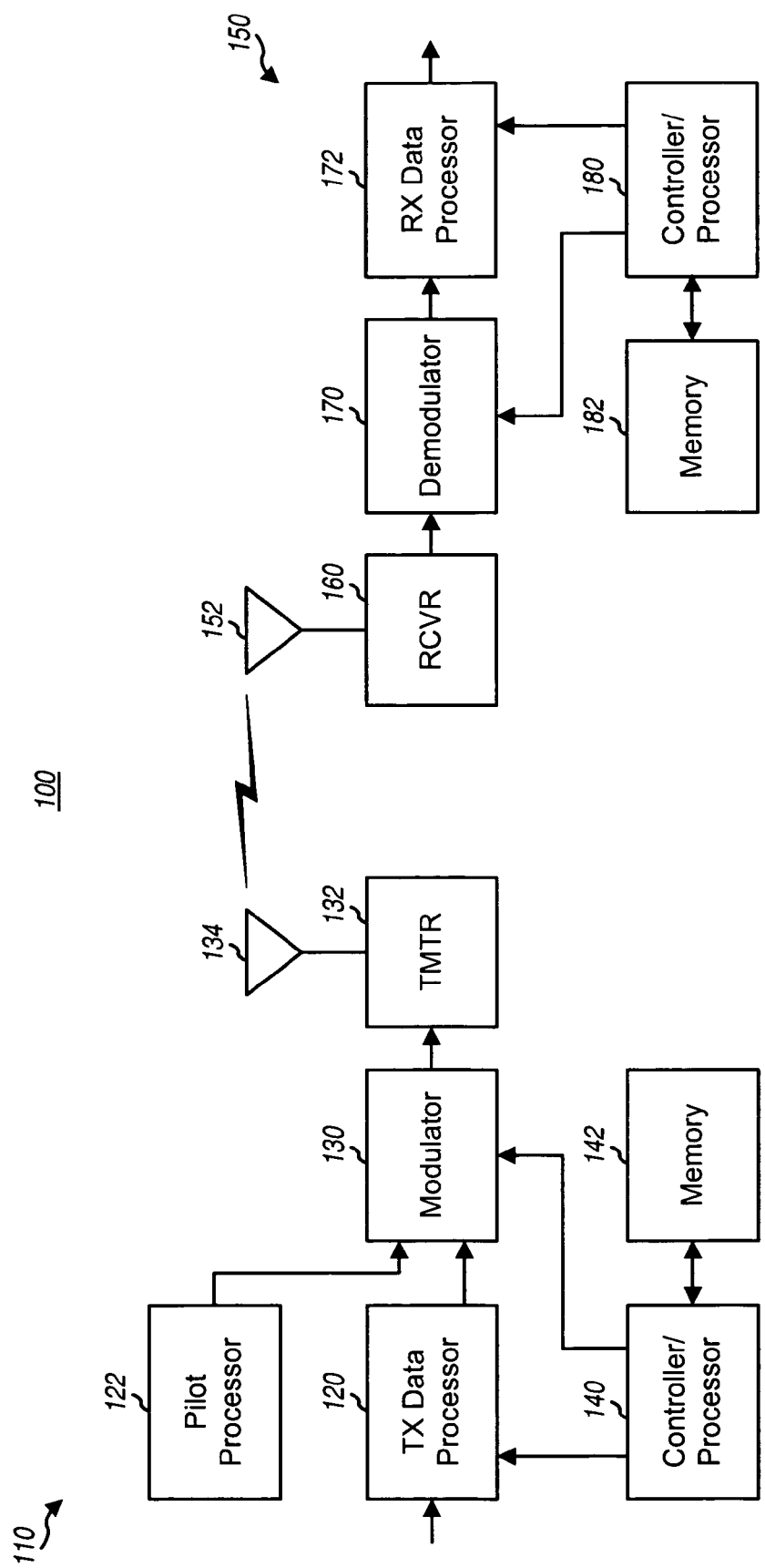
FIG. 1 shows a block diagram of a base station and a terminal.

FIG. 1 shows a block diagram of a base station 110 and a terminal 150 in a broadcast system 100. For simplicity, base station 110 and terminal 150 are each equipped with a single antenna. A base station is typically a fixed station and may also be called a base transceiver system (BTS), an access point, a Node B, and so on. A terminal may be fixed or mobile and may also be called a mobile station, a user equipment, a mobile equipment, and so on. Terminal 150 may be a cellular phone, a personal digital assistant (PDA), a wireless modem, a wireless communication device, a handheld device, a subscriber unit, and so on.

At base station 110, a transmit (TX) data processor 120 processes (e.g., encodes, interleaves, and symbol maps) traffic data and generates data symbols. A pilot processor 122 generates pilot symbols. As used herein, a data symbol is a modulation symbol for data, a pilot symbol is a modulation symbol for pilot, and a modulation symbol is a complex value for a point in a signal constellation, e.g., for PSK or QAM. A modulator 130 multiplexes the data symbols and pilot symbols, performs OFDM modulation on the multiplexed data and pilot symbols, and generates OFDM symbols. A transmitter (TMTR) 132 processes (e.g., converts to analog, amplifies, filters, and frequency upconverts) the OFDM symbols and generates an RF modulated signal, which is transmitted via an antenna 134.

At terminal 150, an antenna 152 receives the RF modulated signal from base station 110 and provides a received RF signal to a receiver (RCVR) 160. Receiver 160 conditions (e.g., filters, amplifies, frequency downconverts, and digitizes) the received RF signal and provides received samples. A demodulator 170 performs OFDM demodulation on the received samples and provides data symbol estimates, which are estimates of the data symbols sent by base station 110. A receive (RX) data processor 172 processes (e.g., symbol demaps, deinterleaves, and decodes) the data symbol estimates and provides decoded data. In general, the processing at terminal 150 is complementary to the processing at base station 110.

Controllers/processors 140 and 180 direct the operation of various processing units at base station 110 and terminal 150, respectively. Memories 142 and 182 store program codes and data for base station 110 and terminal 150, respectively.

Figure 2:
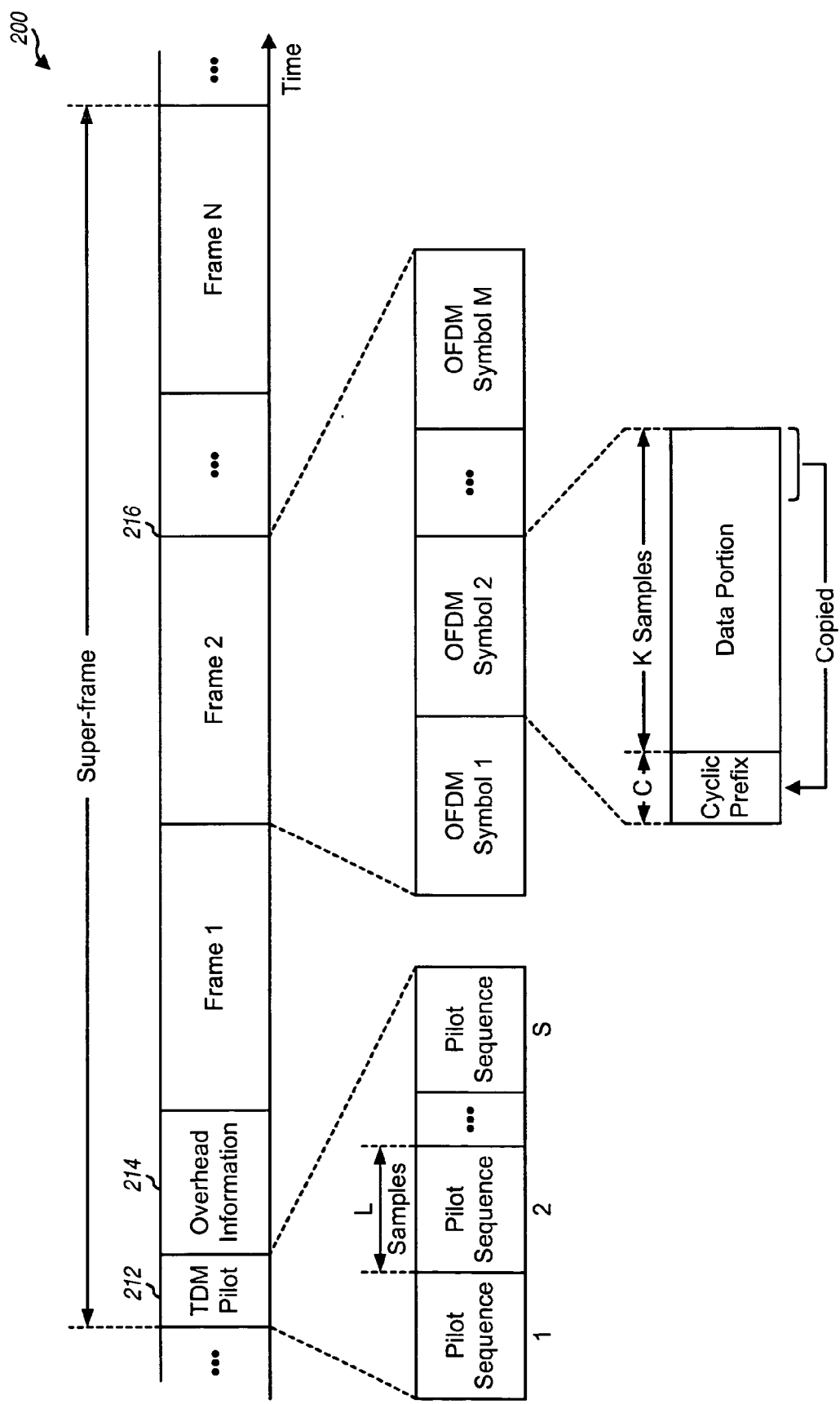
FIG. 2 shows an exemplary super-frame structure.

FIG. 2 shows an exemplary super-frame structure 200 that may be used for broadcast system 100. In the embodiment shown in FIG. 2, the transmission timeline is partitioned into super-frames, with each super-frame having a particular time duration, e.g., approximately one second. Each super-frame includes a field 212 for a time division multiplexed (TDM) pilot, a field 214 for overhead/control information, and a field 216 with N frames for traffic data, where N≧1. A super-frame may also include different and/or additional fields not shown in FIG. 2.

In the embodiment shown in FIG. 2, the TDM pilot is composed of S identical pilot sequences, with each pilot sequence containing L time-domain samples, where S>1 and L>1. The TDM pilot may be generated by (1) performing an L-point inverse fast Fourier transform (IFFT) on L pilot symbols to obtain a pilot sequence with L time-domain samples and (2) repeating the pilot sequence S times. The TDM pilot may be used for signal detection, frame synchronization, initial frequency error estimation, coarse time synchronization and/or other purposes.

The overhead information may convey the identity of a base station transmitting the overhead information, where and how data channels are sent in the frames of a super-frame, and/or other information. The data channels are sent in the N frames and at frequency and time locations indicated by the overhead information. Each data channel may carry any type of data such as video, audio, tele-text, data, video/audio clips, and so on. Terminal 150 may be interested in receiving one or more specific data channels from base station 110. Terminal 150 may ascertain where each desired data channel is sent, e.g., based on the overhead information and/or the data sent on the data channel. Terminal 150 may go to sleep much of the time to conserve battery power and may wake up periodically to receive the desired data channel(s).

Each frame carries multiple (M) OFDM symbols. An OFDM symbol may be generated by (1) performing a K-point IFFT on K modulation symbols to obtain K time-domain samples for a data portion of the OFDM symbol and (2) copying the last C samples of the data portion to form a cyclic prefix for the OFDM symbol. The data portion is also referred to as a useful portion, a transformed symbol, and so on. Windowing/filtering may also be performed on the cyclic prefix and the data portion. An OFDM symbol may contain K+C samples without windowing or possibly more than K+C samples with windowing.

In an embodiment, K=4096, C=512, and each OFDM symbol contains 4608 time-domain samples prior to windowing. In an embodiment, L=128, S=36, and the TDM pilot contains 36 identical pilot sequences of length 128. Other values may also be used for K, C, L and S.

FIG. 2 shows a specific super-frame structure. The frequency control techniques described herein may be used for other frame and super-frame structures.

Figure 3:
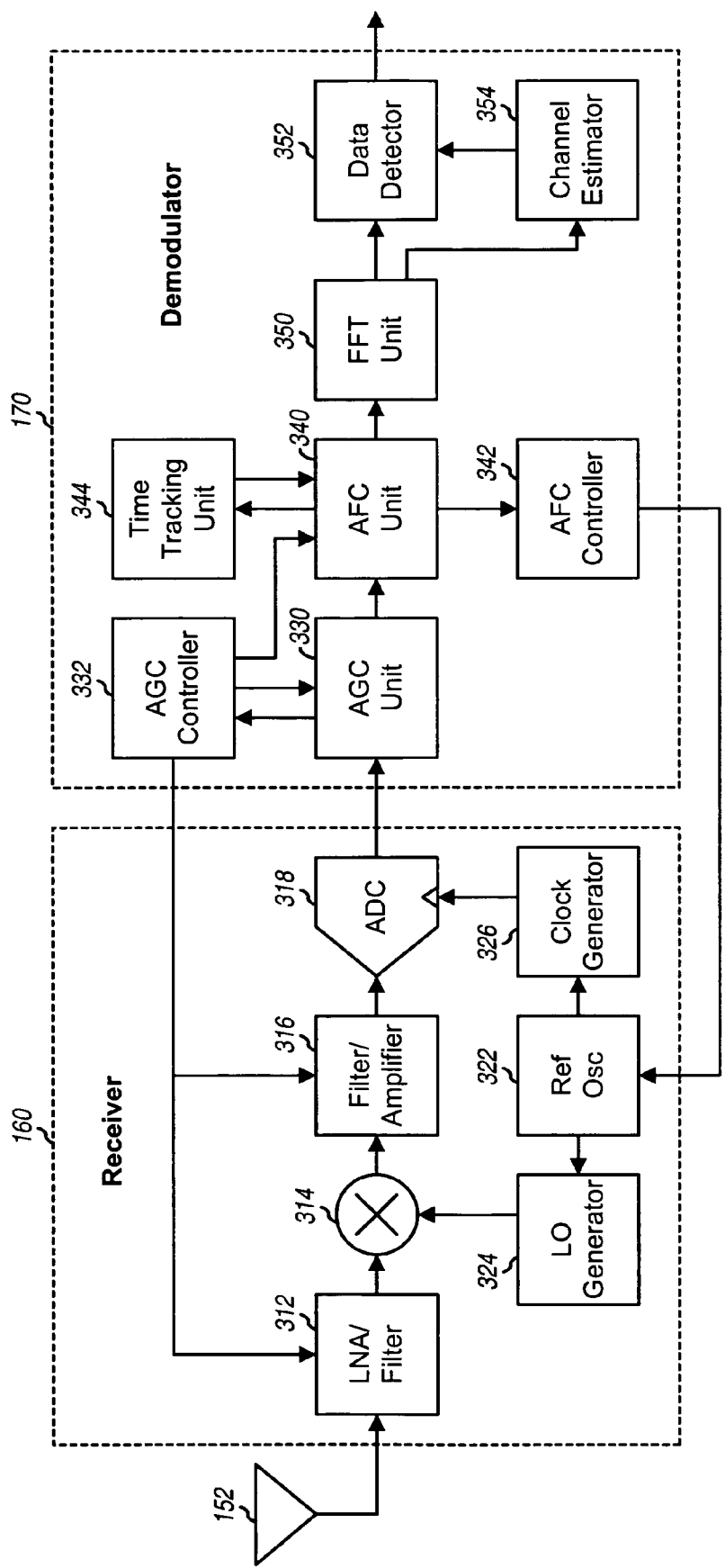
FIG. 3 shows a block diagram of a receiver and a demodulator.

FIG. 3 shows a block diagram of an embodiment of receiver 160 and demodulator 170 at terminal 150. Within receiver 160, a low noise amplifier (LNA) 312 amplifies the received RF signal and provides an amplified RF signal. A filter 312 filters the amplified RF signal to pass signal components in the band of interest and to remove out-of-band noise and undesired signals. A downconverter 314 frequency downconverts the filtered RF signal with an LO signal from an LO generator 324 and provides a downconverted signal. The frequency of the LO signal is selected such that the signal component in an RF channel of interest is downconverted to baseband or near-baseband. A lowpass filter 316 filters the downconverted signal to pass the signal components in the RF channel of interest and to remove noise and undesired signals. An amplifier 316 amplifies the filtered baseband signal and provides an output baseband signal. An analog-to-digital converter (ADC) 318 digitizes the output baseband signal and provides received samples r(k) to demodulator 170. The received samples are typically complex-value samples having inphase (I) and quadrature (Q) components.

A reference oscillator (Ref Osc) 322 generates a reference signal having a precise frequency fref. Reference oscillator 322 may be a voltage controlled crystal oscillator (VCXO), a temperature compensated crystal oscillator (TCXO), a voltage controlled TCXO (VC-TCXO), a voltage controlled oscillator (VCO), or some other type of oscillator. LO generator 324 receives the reference signal and generates the LO signal at the desired RF frequency. A clock generator 326 also receives the reference signal and generates a sampling clock for ADC 318. LO generator 324 and clock generator 326 may each be implemented with VCOs, phase locked loops (PLLs), dividers, and so on, as is known in the art.

FIG. 3 shows a specific design for receiver 160. In general, a receiver may implement a super-heterodyne architecture or a direct-to-baseband architecture. In the super-heterodyne architecture, the received RF signal is downconverted in multiple stages, e.g., from RF to an intermediate frequency (IF) in one stage, and then from IF to baseband in another stage. In the direct-to-baseband architecture, which is shown in FIG. 3, the received RF signal is downconverted from RF directly to baseband in one stage. The super-heterodyne and direct-to-baseband architectures may use different circuit blocks and different LO frequencies. A receiver may also perform signal conditioning with one or more stages of amplifier, filter, mixer, and so on. A receiver may include different and/or additional circuit blocks not shown in FIG. 3.

Within demodulator 170, an automatic gain control (AGC) unit 330 multiplies the received samples r(k) with a variable gain Gagc and provides input samples x(k) having the desired magnitude. An AFC unit 340 estimates frequency error in the input samples, removes the estimated frequency error from the input samples, and provides output samples y(k) having the estimated frequency error removed. A fast Fourier transform (FFT) unit 350 performs a K-point FFT on K output samples for each received OFDM symbol and obtains K frequency-domain received symbols for the K subcarriers. FFT unit 350 provides received symbols for traffic data to a data detector 352 and provides received symbols for pilot to a channel estimator 354. Channel estimator 354 derives channel estimates for the wireless channel between base station 110 and terminal 150 based on the received symbols for pilot. Data detector 352 performs data detection (e.g., equalization or matched filtering) on the received symbols for traffic data with the channel estimates and provides data symbol estimates An AGC controller 332 determines the magnitude of the received samples r(k) and provides the variable gain Gagc used by AGC unit 330 to obtain the desired magnitude for the input samples x(k). AGC controller 332 also provides one or more gain control signals to one or more circuit blocks (e.g., LNA 312, downconverter 314 and/or amplifier 316) within receiver 160. The gain control signal(s) maintain the magnitude of the received samples r(k) within a suitable range. An AFC controller 342 receives the output of AFC unit 340 and generates a frequency control signal for reference oscillator 322. A time tracking unit 344 detects for the start of a superframe (e.g., based on the TDM pilot) and also determines the start of each received OFDM symbol.

Figure 4:
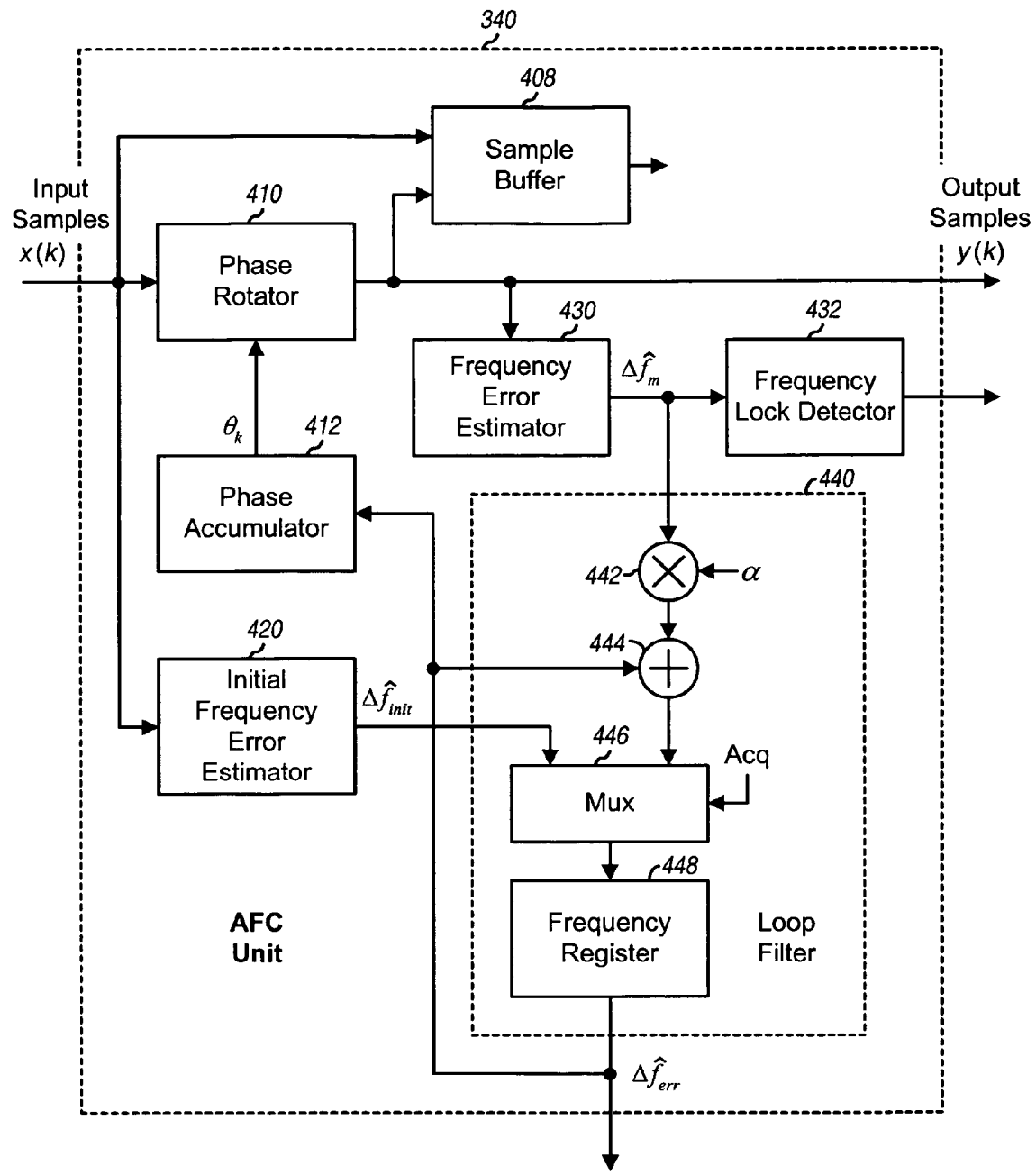
FIG. 4 shows a block diagram of an AFC unit.

FIG. 4 shows a block diagram of an embodiment of AFC unit 340 within demodulator 170 in FIG. 3. Within AFC unit 340, the input samples x(k) are provided to a sample buffer 408, a phase rotator 410, and an initial frequency error estimator 420. Sample buffer 408 stores the input samples and/or output samples for subsequent processing. Estimator 420 derives an initial frequency error estimate $\Delta \hat{f}_{init}$ (e.g., based on the TDM pilot) whenever directed and provides the initial frequency error estimate to one input of a multiplexer (Mux) 446. Phase rotator 410 rotates each input sample x(k) by a phase value $\theta_k$ from a phase accumulator 412 and provides a phase-rotated output sample y(k). The output samples have much of the frequency error removed once frequency lock is achieved. A frequency error estimator 430 derives frequency error estimates $\Delta \hat{f}_m$, e.g., based on received OFDM symbols. The frequency error estimates are indicative of the residual frequency error in the output samples. A frequency lock detector 432 determines whether frequency lock is achieved.

A loop filter 440 filters the frequency error estimates $\Delta \hat{f}_m$ and provides an average frequency error $\Delta \hat{f}_{err}$, which is indicative of the frequency error in the input samples. Within loop filter 440, a multiplier 442 multiplies the frequency error estimates $\Delta \hat{f}_m$ with a loop gain $\alpha$. A summer 444 sums the output of multiplier 442 with the output of a frequency register 448. Multiplexer 446 receives the output of summer 444 at another input and provides either the output of summer 444 or the initial frequency error estimate $\Delta \hat{f}_{init}$. Frequency register 448 stores the output of multiplexer 446 and provides the average frequency error $\Delta \hat{f}_{err}$. Phase accumulator 412 accumulates the average frequency error in each sample period and provides the phase value for each input sample.

Phase rotator 410, frequency error estimator 430, loop filter 440, and phase accumulator 412 form an AFC loop that estimates and corrects frequency error in the input samples. In an embodiment, the AFC loop operates as follows. When the terminal first wakes up or first tunes to the broadcast system, estimator 420 derives an initial frequency error estimate $\Delta \hat{f}_{init}$ that captures much of the frequency error between the base station and the terminal. Frequency register 448 stores the initial frequency error estimate. Phase accumulator 412 computes the phase shift in each sample period due to the frequency error from register 448. Phase rotator 410 rotates each input sample by the phase shift from phase accumulator 412. Thereafter, for each received OFDM symbol, estimator 430 derives a frequency error estimate $\Delta \hat{f}_m$ based on the output samples for that OFDM symbol. The frequency error estimate $\Delta \hat{f}_m$ is scaled by the loop gain $\alpha$ and accumulated by frequency register 448 via summer 444 and multiplexer 446. Hence, frequency register 448 and the AFC loop are initialized with the initial frequency error estimate and are thereafter updated by the frequency error estimate from each received OFDM symbol.

In the embodiment described above, phase rotation is performed on each input sample, and the AFC loop is updated in each OFDM symbol period. The AFC loop may also be updated at other rates. In general, the AFC loop may be updated whenever a frequency error estimate is available. For example, the AFC loop may be updated after receiving an OFDM symbol, after receiving a burst of data, at the end of a frame, and so on. The AFC loop may also be operated in different modes, e.g., an acquisition mode and a tracking mode, as described below.

The input samples for the broadcast system may be expressed as:

$$x(k)=s(k) \cdot e^{j 2\pi \cdot \Delta f \cdot k \cdot T_s + \phi} + n(k), \quad \text{Eq (1)}$$

where s(k) is a sample transmitted in sample period k, x(k) is an input sample for sample period k, n(k) is the noise for input sample x(k), $\Delta f$ is a frequency error, $\phi$ is an arbitrary phase, and $T_s$ is one sample period.

The TDM pilot contains S identical pilot sequences, as shown in FIG. 2. Hence, the transmitted samples are periodic during the TDM pilot, and s(k)=s(k+L). In this case, a correlation on the input samples may be expressed as:

$$x^*(k) \cdot x(k+L) = |s(k)|^2 \cdot e^{j 2\pi \cdot \Delta f \cdot L \cdot T_s} + \tilde{n}(k), \quad \text{Eq (2)}$$

where ñ(k) is the post-processed noise. Equation (2) indicates that the frequency error Δf may be isolated by correlating input sample x(k) with delayed input sample x(k+L).

A delayed correlation may be performed for each pilot sequence as follows:

$$C_l = \sum_{i=1}^{L} x_l^*(i) \cdot x_l(i+L),\qquad \text{Eq (3)}$$

where $x_l(i)=x(i+l\cdot L+k_s)$ is the i-th input sample for the l-th pilot sequence, $k_s$ is the sample index for the start of the first pilot sequence, and $C_l$ is the correlation result for the l-th pilot sequence.

The correlation results for multiple pilot sequences may be accumulated, as follows:

$$C_{init} = \sum_{l=1}^{S'} C_l,\qquad \text{Eq (4)}$$

where S' is the number of delayed correlations performed, which is S'≤S, and $C_{init}=W_I+jW_Q$ is the accumulated correlation result for all pilot sequences.

Equation (4) performs coherent accumulation on the S' correlation results and provides $C_{init}$, which is a complex value having an inphase component $W_I$ and a quadrature component $W_Q$.

An initial frequency error estimate may be derived based on the accumulated correlation result, as follows:

$$\Delta \hat{f}_{init} = \frac{1}{G_L} \arctan\left[\frac{W_Q}{W_I}\right],\qquad \text{Eq (5)}$$

where $G_L$ is a detector gain, which is $G_L=2\pi\cdot L\cdot T_s$.

The start of the first pilot sequence may be ascertained by performing a sliding correlation on the input samples and detecting for a peak in the sliding correlation. The input samples may be buffered in sample buffer 408, and the delayed correlation in equation (3) may be performed for all pilot sequences after the TDM pilot has been detected. Alternatively, the TDM pilot may be detected using some of the pilot sequences, and the initial frequency error estimate may be derived using the remaining pilot sequences.

Figure 5:
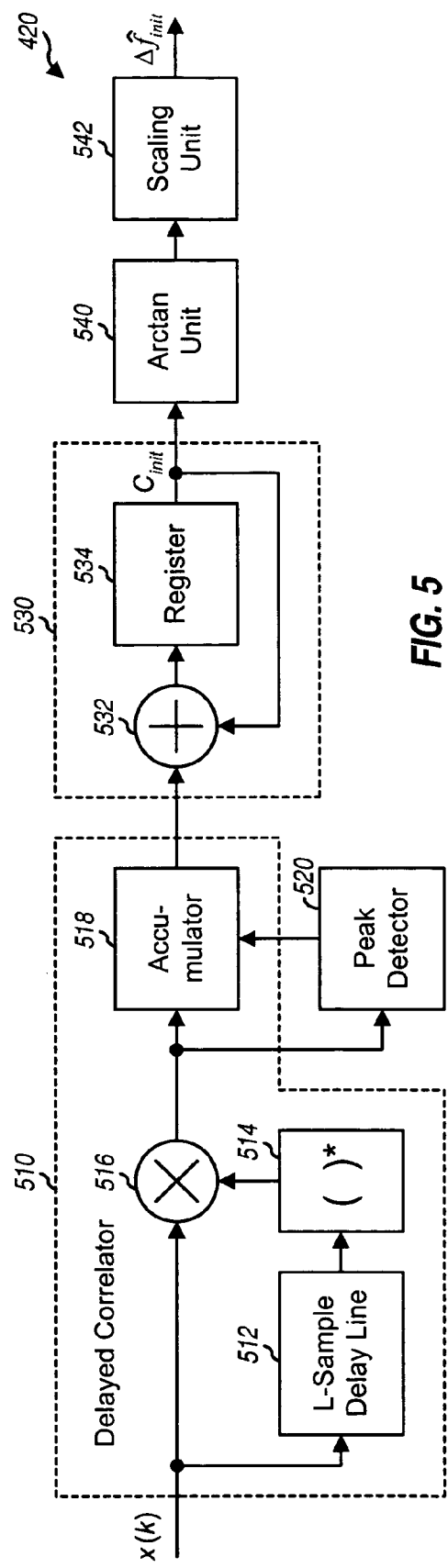
FIG. 5 shows a block diagram of an initial frequency error estimator.

FIG. 5 shows a block diagram of an embodiment of initial frequency error estimator 420 in FIG. 4. In this embodiment, a delayed correlator 510 receives the input samples x(k) and performs the delayed correlation shown in equation (3). Within delayed correlator 510, the input samples are provided to an L-sample delay line 512 and a multiplier 516. Delay line 512 delays each input sample by L sample periods, which is the length of the pilot sequence. A unit 514 provides the complex conjugate of each delayed sample from delay line 512. Multiplier 516 multiplies each input sample with the corresponding output from unit 514 and provides the product $x_l^*(i)\cdot x_l(i+L)$ in each sample period. A peak detector 520, which may be part of time tracking unit 344 in FIG. 3, detects for the TDM pilot and provides the sample index $k_s$ for the start of the first pilot sequence. An accumulator 518 accumulates the output of multiplier 516 over L sample periods for one pilot sequence and provides the correlation result $C_l$ for each pilot sequence.

An accumulator 530, which is formed with a summer 532 and a register 534, accumulates the correlation results from delayed correlator 510 for all pilot sequences and provides the accumulated result $C_{init}$. An arctan unit 540 computes the arctangent of $C_{init}$. A scaling unit 542 scales the output of arctan unit 540 and provides the initial frequency error estimate $\Delta\hat{f}_{init}$.

In an embodiment, the arctangent in equation (5) is computed using two look-up tables. Once look-up table is used to efficiently compute the ratio $W_Q/W_I$ in equation (5), and another look-up table is used to compute the arctangent.

Figure 6:
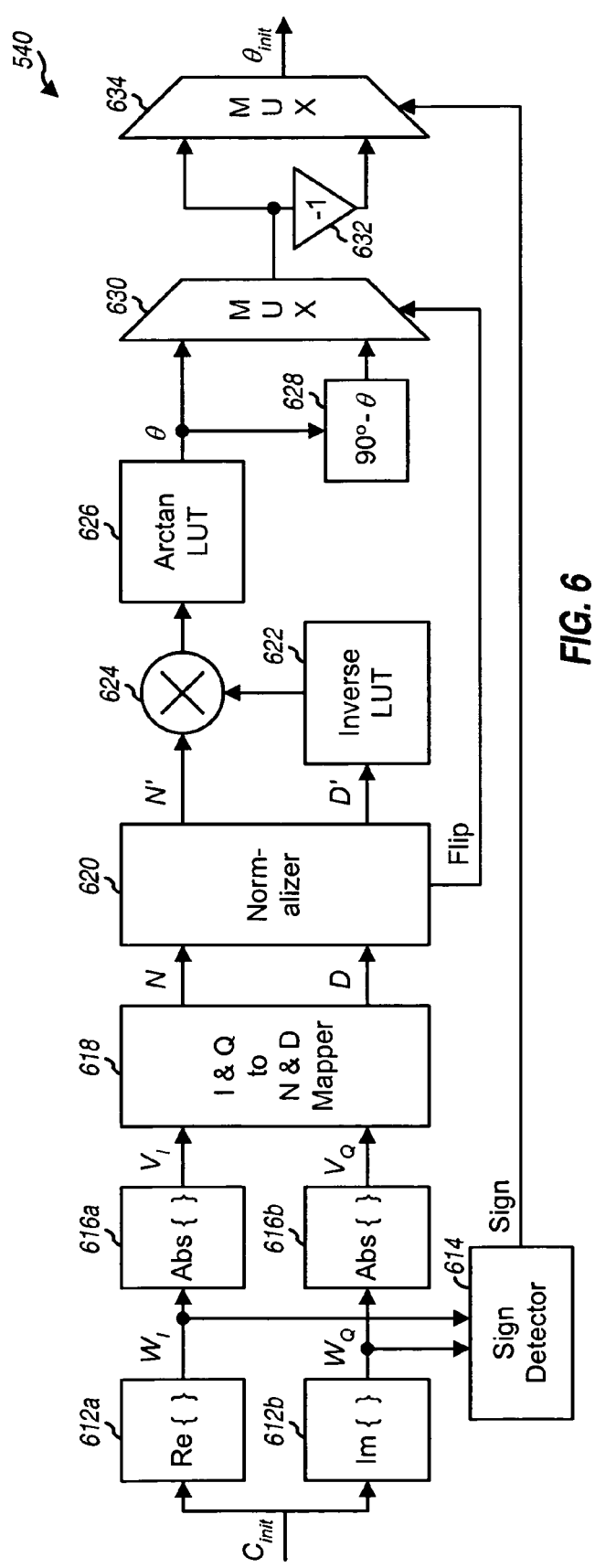
FIG. 6 shows a block diagram of an arctangent unit.

FIG. 6 shows a block diagram of an embodiment of arctan unit 540 in FIG. 5. Within arctan unit 540, a unit 612a receives the accumulated correlation result $C_{init}$ and provides the real part, which is $W_I=\text{Re}\{C_{init}\}$. A unit 612b also receives $C_{init}$ and provides the imaginary part, which is $W_Q=\text{Im}\{C_{init}\}$. A sign detector 614 detects for the sign of the ratio $W_Q/W_I$ and generates a Sign bit, as follows:

$$\text{Sign} = \begin{cases} 1 & \text{if } \{(W_I<0)\text{ AND }(W_Q>0)\}\text{ OR }\{(W_I>0)\text{ AND }(W_Q<0)\}, \\ 0 & \text{otherwise.} \end{cases}\qquad \text{Eq (6)}$$

The Sign bit indicates whether or not to invert the output depending on the quadrant within which $C_{init}$ falls.

A unit 616a receives the real part $W_I$ and provides the magnitude of $W_I$, which is $V_1=\text{Abs}\{W_I\}$, where Abs { } denotes the absolute of the quantity within { }. A unit 616b receives the imaginary part $W_Q$ and provides the magnitude of $W_Q$, which is $V_Q=\text{Abs}\{W_Q\}$. A mapper 618 maps $V_I$ and $V_Q$ to a numerator N and a denominator D, as follows:

If $(V_I \geq V_Q)$ then set $N=V_Q$, $D=V_I$, and Flip=0; else set
$N=V_I$, $D=V_Q$, and Flip=1.  Eq (7)

The mapping in equation (7) moves the larger of $V_I$ and $V_Q$ to the denominator, which results in the ratio N/D being less than or equal to 1.0, or (N/D)≤1.0. The arctangent of N/D is then limited to a range of 0 to 45°, which allows for use of a smaller arctan look-up table.

A normalize unit 620 shifts the denominator D to the right so that the most significant bit (MSB) is '1' and provides a normalized denominator D'. Unit 620 also shifts the numerator N by the same number of bits as the denominator and provides a normalized numerator N'. An inverse look-up table (LUT) 622 receives D' and provides 1/D'. A multiplier 624 multiplies N' with 1/D' and provides the ratio N'/D'.

An arctan look-up table 626 receives the ratio N'/D' and provides the arctangent of N'/D', or θ=arctan(N'/D'), where 0°≤θ≤45° due to the conditioning described above. A multiplexer (MUX) 630 provides θ if the Flip bit indicates that $V_I$ and $V_Q$ have not been flipped by mapper 618 and provides 90°-θ, which is generated by a unit 628, if $V_I$ and $V_Q$ have been flipped. An inverter 632 inverts the output of multiplexer 630. A multiplexer 634 provides the output of multiplexer 630 as the detected phase $\theta_{init}$ if the Sign bit indicates no inversion and provides the output of inverter 632 otherwise.

FIG. 6 shows an embodiment for efficiently computing arctangent for the initial frequency error estimate. The arctangent may also be computed in other manners.

The terminal may receive the RF modulated signal from the base station via one or more signal paths. For each OFDM symbol sent by the base station, the terminal obtains a copy of the OFDM symbol via each signal path. Each OFDM symbol copy is scaled by the complex gain for the associated signal path and is further delayed by the propagation delay for that signal path.

Figure 7:
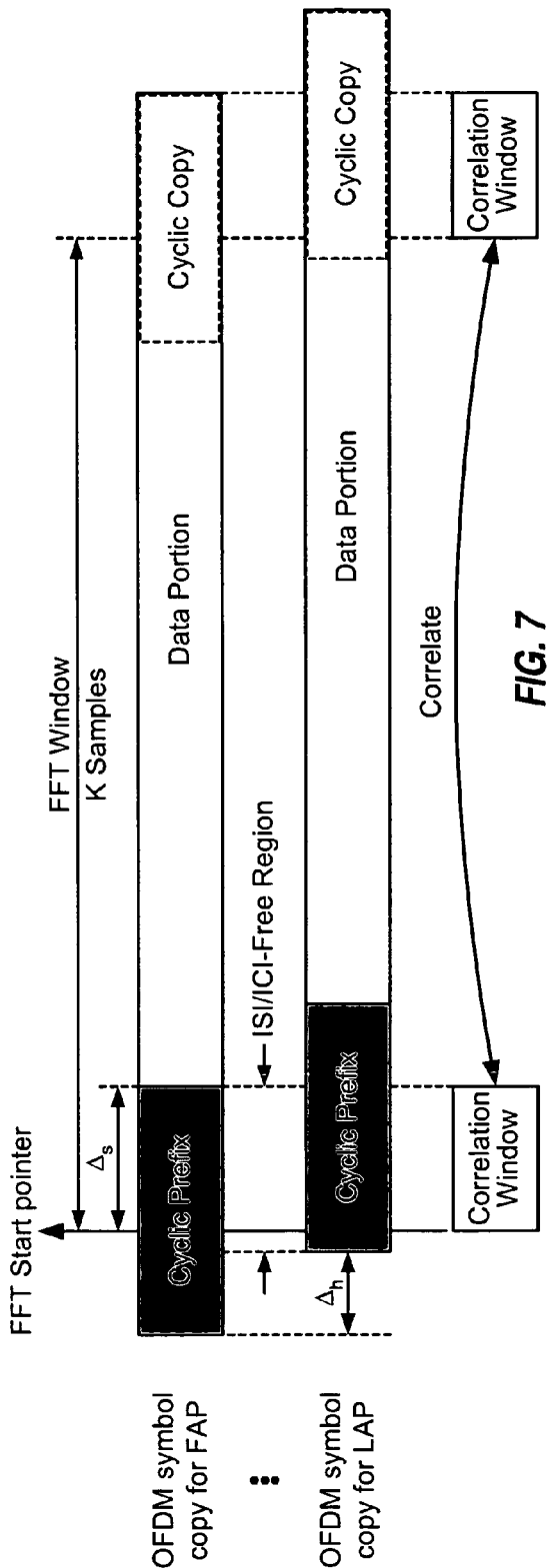
FIG. 7 shows OFDM symbol copies received via multiple signal paths.

FIG. 7 shows reception of an OFDM symbol via a wireless channel with multiple signal paths. Each signal path may have any complex gain and any delay, both of which are determined by the channel environment. For simplicity, the gains for the signal paths are assumed to be equal. A first OFDM symbol copy is received via the first arriving path (FAP), and a last OFDM symbol copy is received via the last arriving path (LAP). The start of the last OFDM symbol copy is delayed by Ah samples from the start of the first OFDM symbol copy, where Ah is the delay spread of the wireless channel. The received OFDM symbol is a superposition of all of the OFDM symbol copies.

FIG. 7 also shows proper placement of an FFT window for the received OFDM symbol. The FFT window has a width of K samples and determines which samples are used for subsequent processing. The start of the FFT window is indicated by an FFT Start pointer. In the example shown in FIG. 7, the start of the FFT window is $\Delta_s$ samples earlier than the start of the data portion for the first OFDM symbol copy and is $\Delta_h + \Delta_s$ samples earlier than the start of the data portion for the last OFDM symbol copy.

FIG. 7 also shows an ISI/ICI-free region, which is an overlapping region for the cyclic prefixes for all OFDM symbol copies. The width of the ISI/ICI-free region is dependent on the delay spread Ah and the cyclic prefix length C. If the FFT Start pointer is placed within the ISI/ICI-free region, as shown in FIG. 7, then the proper K samples are used for processing, and inter-symbol interference (ISI) and inter-carrier interference (ICI) are not encountered, which is desirable.

Time tracking unit 344 in FIG. 3 attempts to maintain the FFT Start pointer within the ISI/ICI-free region for each received OFDM symbol. Unit 344 may obtain a channel impulse response estimate for the wireless channel, detect for the FAP and LAP, and adjust the FFT Start pointer to be within the ISI/ICI-free region.

As shown in FIG. 7, each OFDM symbol copy has a cyclic prefix that is identical to the last C samples of the data portion, which is labeled as "cyclic copy" in FIG. 7. A correlation window may be defined from the FFT Start pointer to the end of the cyclic prefix for the first OFDM symbol copy. The samples within the correlation window are periodic for all OFDM symbol copies, so that y(k)=y(k+K) for each sample y(k) within the correlation window.

A frequency error estimate may be computed for each received OFDM symbol based on the cyclic prefix, as follows:

$$\Delta \hat{f}_m = \text{Im}\left[\sum_{i=1}^{C'} y_m^*(i) \cdot y_m(i+K)\right], \quad \text{Eq (8)}$$

where $y_m(i)$ is the i-th output sample for the m-th OFDM symbol,
  $\Delta \hat{f}_m$ is a frequency error estimate for the m-th OFDM symbol, and
  C' is the number of samples over which the delayed correlation is performed.

The first output sample $y_m(1)$ in equation (8) may be the first sample within the FFT window. The Im [ ] function provides the imaginary part of the complex value within the square bracket. The Im [ ] function in equation (8) is an approximation of the arctangent function in equation (5). This approximation is reasonably accurate when the quantity within the square bracket in equation (8) is small, which is typically the case once frequency lock is achieved.

The delayed correlation in equation (8) is performed over C' samples, where C'≦C. In general, the delayed correlation may be performed over all or a subset of the C samples for the cyclic prefix. In one embodiment, the delayed correlation is performed over all samples within the correlation window. In the embodiment shown in FIG. 7, the correlation window contains $\Delta_s$ samples and is determined by the FFT Start pointer. In another embodiment, the delayed correlation is performed over all samples within the ISI/ICI-free region.

In yet another embodiment, the samples used for frequency error estimation are selected as follows:

If $1 \leq \text{FFT\_Start} \leq C/2$, use samples $C/2+1$ to $C$;

If $C/2 \leq \text{FFT\_Start} \leq 3C/4$, use samples $3C/4+1$ to $C$;
 and  Eq (9)

If $3C/4 < \text{FFT\_Start} \leq C$, use no samples.

In the embodiment shown in equation (9), a frequency error estimate is derived based on (1) the second half of the cyclic prefix if the FFT Start pointer falls within the first half of the cyclic prefix or (2) the last quarter of the cyclic prefix if the FFT Start pointer falls within the third quarter of the cyclic prefix. A frequency error estimate is not derived if the FFT Start pointer falls within the last quarter of the cyclic prefix.

The samples may also be selected for use for frequency error estimation based on the timing of the received OFDM symbol in other manners.

Figure 8:
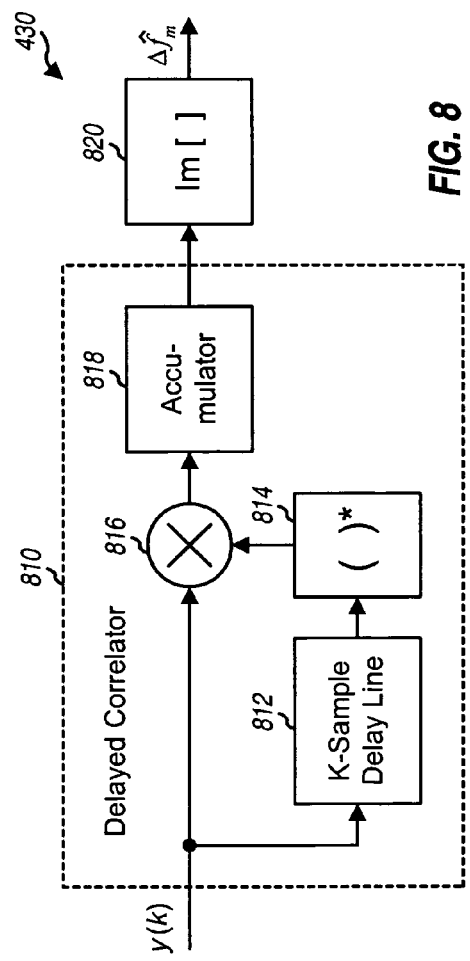
FIG. 8 shows a block diagram of a frequency error estimator.

FIG. 8 shows a block diagram of an embodiment of frequency error estimator 430 in FIG. 4. In this embodiment, a delayed correlator 810 receives the output samples y(k) and performs the delayed correlation shown within the square bracket in equation (8). Delayed correlator 810 includes a delay line 812, a complex-conjugate unit 814, a multiplier 816, and an accumulator 818 that operate in similar manner as units 512, 514, 516 and 518, respectively, within delayed correlator 510 in FIG. 5. However, delay line 812 delays each output sample by K sample periods, which constitute the length of the data portion. Accumulator 818 accumulates the output of multiplier 816 over C' sample periods for the cyclic prefix and provides a correlation result $C_m$ for each received OFDM symbol. C' may be dependent on the timing of the received OFDM symbol and may be different for different OFDM symbols. A unit 820 provides the imaginary part of the correlation result $C_m$ as the frequency error estimate $\Delta \hat{f}_m$.

FIGS. 5 and 8 show exemplary embodiments of frequency error estimators 420 and 430, respectively. The embodiment in FIG. 5 relies on the periodic nature of the TDM pilot to derive the initial frequency error estimate. The embodiment in FIG. 8 relies on the periodic nature of the cyclic prefix in each OFDM symbol to derive a frequency error estimate. In general, frequency error estimation may be performed in various manners depending on the structure of the transmitted signal, the radio technology used for the transmitted signal, and/or other factors.

Figure 9:
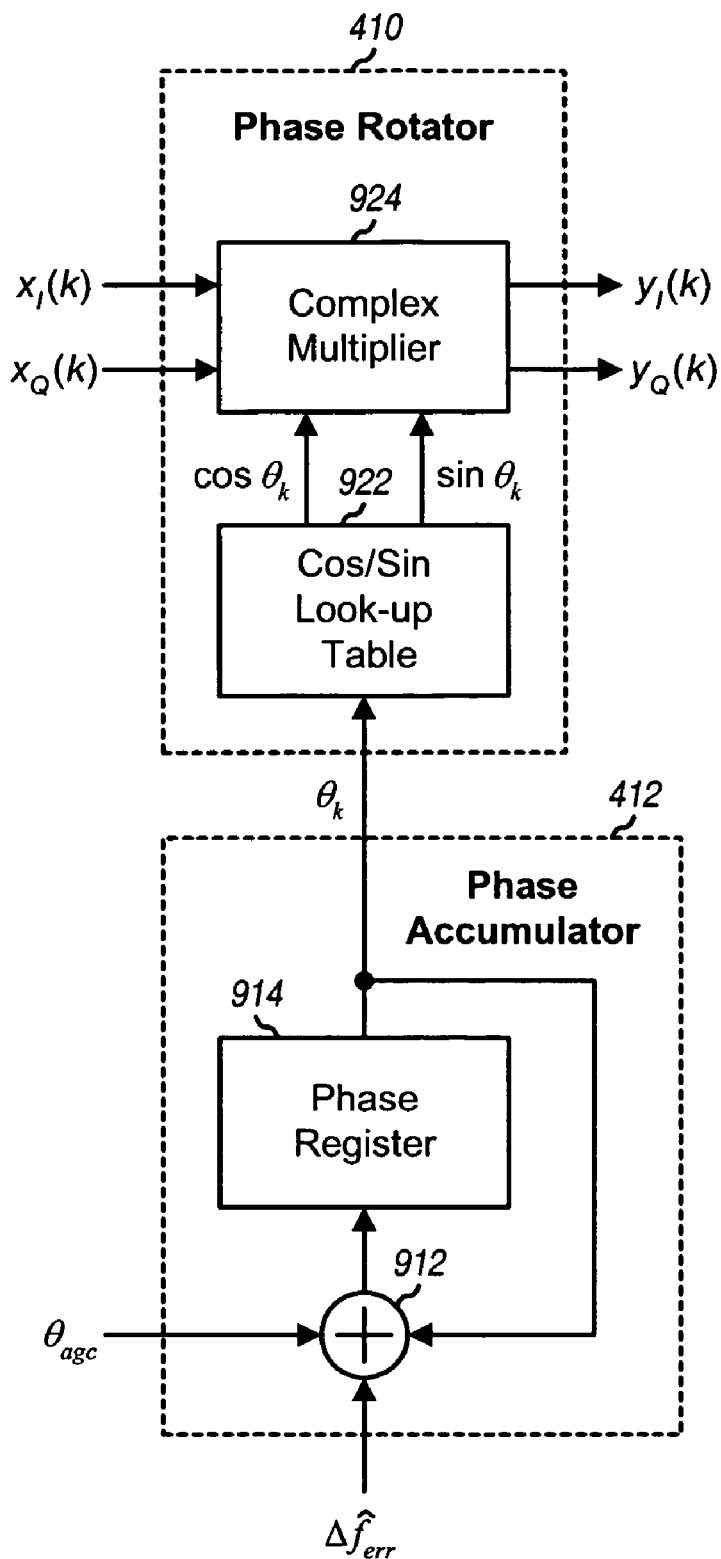
FIG. 9 shows a block diagram of a phase accumulator and a phase rotator.

FIG. 9 shows a block diagram of an embodiment of phase rotator 410 and phase accumulator 412 in FIG. 4. Within phase accumulator 412, a summer 912 receives the current frequency error estimate $\Delta \hat{f}_{err}$ from frequency register 448 in FIG. 4, a phase adjustment $\theta_{agc}$ from AGC controller 332 in FIG. 3, and the output of a phase register 914. Summer 912 sums all three inputs and provides the result to phase register

914. Phase register 914 is updated by the output of summer 912 in each sample period. The phase value provided by phase register 914 in each sample period may be given as $\theta_k = -2\pi \cdot k \cdot \Delta \hat{f}_{err}$, which assumes that $\theta_{agc} = 0$.

Referring back to FIG. 3, the circuit blocks within receiver 160 may operate in one of multiple gain states. Each gain state may be associated with a specific set of gain settings for the circuit blocks in order to achieve the desired signal level at the input of ADC 318. Different gain settings may be associated with different phases. AGC controller 332 may store a table of phases for different gain states. Whenever a switch in gain state is made, AGC controller 332 may determine the difference between the phase of the new gain state and the phase of the prior gain state. AGC controller 332 may then provide to AFC unit 340 the negative of this phase difference as the phase adjustment $\theta_{agc}$. Referring again to FIG. 9, the phase adjustment $\theta_{agc}$ is added once to phase register 914. Hence, $\theta_{agc}$ is zero except whenever a change in gain state occurs. This phase adjustment results in the output samples y(k) having approximately continuous phase when switching between gain states associated with different phases.

Within phase rotator 410, a cos/sin look-up table 922 receives the phase value $\theta_k$ from phase accumulator 412 and provides the cosine and sine of $\theta_k$. A complex multiplier 924 multiplies each input sample x(k) with the sine and cosine and provides a phase-rotated output sample y(k), which may be given as:

$$y_I(k) + j\, y_Q(k) = [x_I(k) + j\, x_Q(k)] \cdot [\cos \theta_k + j \sin \theta_k], \quad \text{Eq (10)}$$

where $x(k) = x_I(k) + j\, x_Q(k)$ is a complex-valued input sample for sample period k, and
  $y(k) = y_I(k) + j\, y_Q(k)$ is a complex-valued output sample for sample period k.

Complex multiplier 924 may be implemented with four real multiplications and two real additions.

Referring back to FIG. 4, frequency lock detector 432 may detect for frequency lock in various manners. In an embodiment, detector 432 initially resets a counter to zero. Thereafter, detector 432 compares each frequency error estimate $\Delta \hat{f}_m$ from estimator 430 against a threshold $\Delta \hat{f}_{th}$, increments the counter if the frequency error estimate is less than the threshold, and decrements the counter otherwise. Detector 432 may declare frequency lock if the counter reaches a maximum value and may declare loss of lock if the counter reaches zero. The number of bits for the counter and the threshold $\Delta \hat{f}_{th}$ may be selected to achieve good lock detection performance. Frequency lock may also be detected in other manners.

In an embodiment, the AFC loop may be operated in an acquisition mode or a tracking mode. Different parameter values may be used for the AFC loop in the two modes. A larger loop gain $\alpha$ may be used for the acquisition mode, and a smaller loop gain may be used for the tracking mode. The frequency error estimate $\Delta \hat{f}_m$ may also be limited to within a larger range for the acquisition mode and to within a smaller range for the tracking mode. The acquisition and tracking modes may also be implemented in other manners. The terminal may support different and/or additional modes. For example, the terminal may also support a hold mode in which the AFC loop is maintained fixed, e.g., if the received signal quality is poor or if some other conditions are detected.

The terminal may start in the acquisition mode when powered on, after waking up from an extended sleep, when frequency lock is lost, and/or for other conditions. The terminal may transition from the acquisition mode to the tracking mode upon detecting frequency lock, or if the adjustment applied to frequency register 448 is below a particular value for some number of updates, or if some other conditions are satisfied.

The terminal may periodically receive data from the broadcast system. For example, each frame may carry many OFDM symbols (e.g., approximately 300 OFDM symbols), and the terminal may receive only few OFDM symbols (if any) in each frame. In this case, the terminal may sleep for most of the frame, wake up several OFDM symbols prior to the first OFDM symbol of interest, and process each OFDM symbol of interest. The terminal may update the AFC loop in each OFDM symbol period while awake and may hold the AFC loop while asleep.

In the embodiment shown in FIG. 4, the AFC loop is a first-order loop having a transfer function of $H_{afc}(s)$ in the s-domain, which may be expressed as:

$$H_{afc}(s) = \frac{\alpha}{s + \alpha}. \quad \text{Eq (11)}$$

The bandwidth of the AFC loop may be expressed as:

$$BW_{afc} = \frac{\alpha}{4}. \quad \text{Eq (12)}$$

The AFC loop bandwidth may be selected to achieve the desired frequency acquisition and tracking performance. The desired AFC loop bandwidth may be obtained by selecting the proper value for the loop gain $\alpha$.

For clarity, the AFC loop has been described for a specific broadcast system. Other designs may also be used for the AFC loop. In general, the AFC loop may be designed in accordance with the structure of the signal transmitted by the system and the radio technology used by the system.

Referring back to FIG. 3, the terminal may perform frequency control in various manners. In one embodiment, AFC unit 340 corrects for both short-term frequency variations (e.g., due to Doppler effect) and long-term frequency variations (e.g., due to component tolerances and temperature variations). In another embodiment, the AFC loop within AFC unit 340 corrects for short-term frequency variations, and an outer loop within AFC controller 342 corrects for long-term frequency variations. The outer loop may receive the frequency error $\Delta \hat{f}_{err}$ from AFC unit 340, average this frequency error over a longer period (e.g., a frame or a burst of data), and generate the frequency control signal for reference oscillator 322 based on the average frequency error. In yet another embodiment, AFC controller 342 may receive frequency error estimates from other AFC loops for other systems that are also being received by the terminal. AFC controller 342 may then generate the frequency control signal such that good performance may be achieved for all systems being received. The frequency control signal may be an analog signal or a digital signal. AFC controller 342 may perform signal conditioning such as digital-to-analog conversion, level shifting, scaling, and so on. AFC controller 342 may also generate a pulse width modulated (PWM) control signal.

Figure 10:
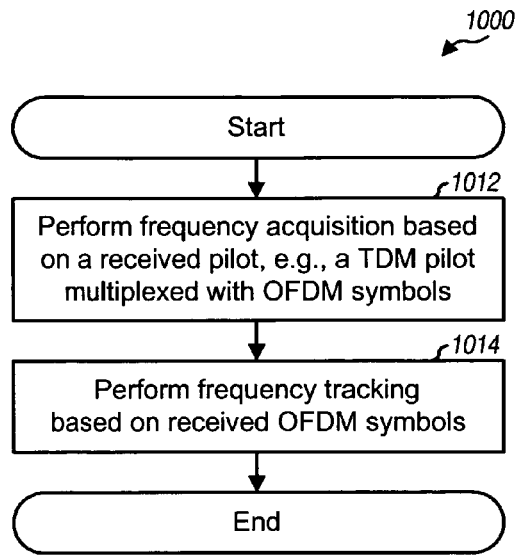
FIG. 10 shows a process for performing frequency control.

FIG. 10 shows an embodiment of a process 1000 for performing frequency control in a system that transmits a pilot along with OFDM symbols. Frequency acquisition is performed based on a received pilot, e.g., a TDM pilot multiplexed with OFDM symbols (block 1012). Frequency tracking is performed based on received OFDM symbols (block 1014). For frequency acquisition, an initial frequency error estimate may be derived based on the received pilot, and an AFC loop may be initialized with the initial frequency error estimate. For frequency tracking, a frequency error estimate may be derived for each received OFDM symbol, and the AFC loop may be updated with the frequency error estimate.

The pilot may comprise multiple pilot sequences. The initial frequency error estimate may then be derived by performing delayed correlation on the pilot sequences. The frequency error estimate for each received OFDM symbol may be derived by performing delayed correlation between samples for the cyclic prefix and samples for the data portion of the received OFDM symbol. Frequency error in input samples is corrected by the AFC loop with the initial frequency error estimate as well as the frequency error estimate for each received OFDM symbol.

Figure 11:
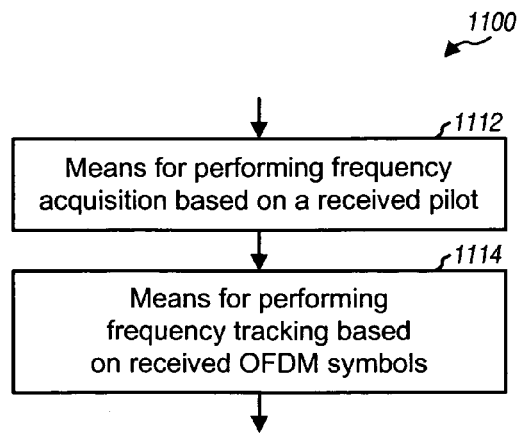
FIG. 11 shows an apparatus for performing frequency control.

FIG. 11 shows an embodiment of an apparatus 1100 for performing frequency control. Apparatus 1100 includes means for performing frequency acquisition based on a received pilot (block 1112), and means for performing frequency tracking based on received OFDM symbols (block 1114).

Figure 12:
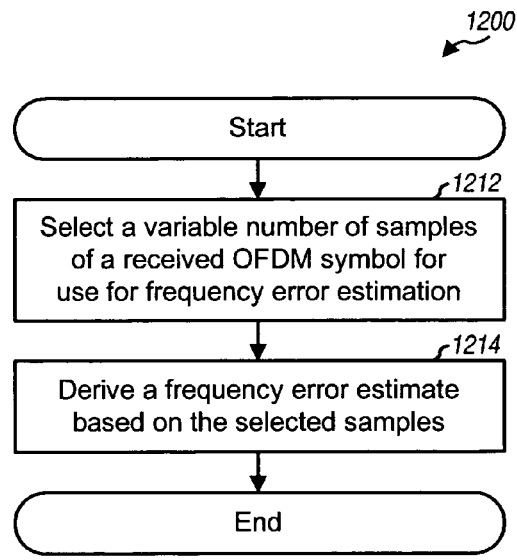
FIGS. 12 and 13 show a process and an apparatus, respectively, for deriving a frequency error estimate.

FIG. 12 shows an embodiment of a process 1200 for deriving a frequency error estimate. A variable number of samples of a received OFDM symbol are selected for use for frequency error estimation (block 1212). A frequency error estimate is derived based on the selected samples (block 1214). For block 1212, the timing of the received OFDM symbol may be determined, and samples may be selected based on the timing of the received OFDM symbol. In an embodiment, the start of an FFT window is determined based on the timing of the received OFDM symbol. The samples to use for frequency error estimation are then selected from among the samples within the FFT window and for the cyclic prefix of the received OFDM symbol. In an embodiment, if the start of the FFT window is within a first range of the cyclic prefix, then samples in a second range of the cyclic prefix are selected. The first range may cover the first half of the cyclic prefix, and the second range may cover the second half of the cyclic prefix, as shown in equation (9). The first range may cover the third quarter of the cyclic prefix, and the second range may cover the fourth quarter of the cyclic prefix, as also shown in equation (9). No samples may be selected for frequency error estimation if the start of the FFT windows falls within a particular range (e.g., the fourth quarter) of the cyclic prefix.

Figure 13:
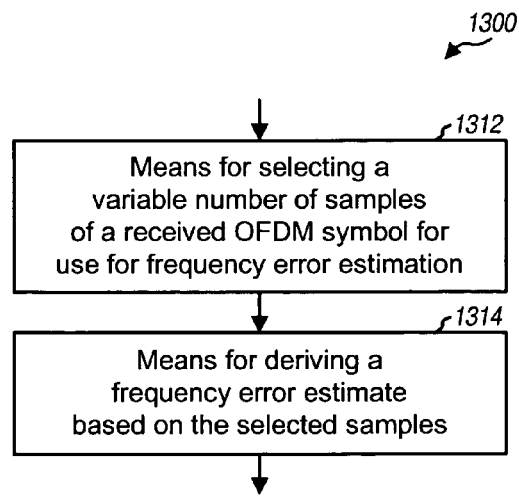

FIG. 13 shows an embodiment of an apparatus 1300 for deriving a frequency error estimate. Apparatus 1300 includes means for selecting a variable number of samples of a received OFDM symbol for use for frequency error estimation (block 1312) and means for deriving a frequency error estimate based on the selected samples (block 1314).

Figures 14, 15:
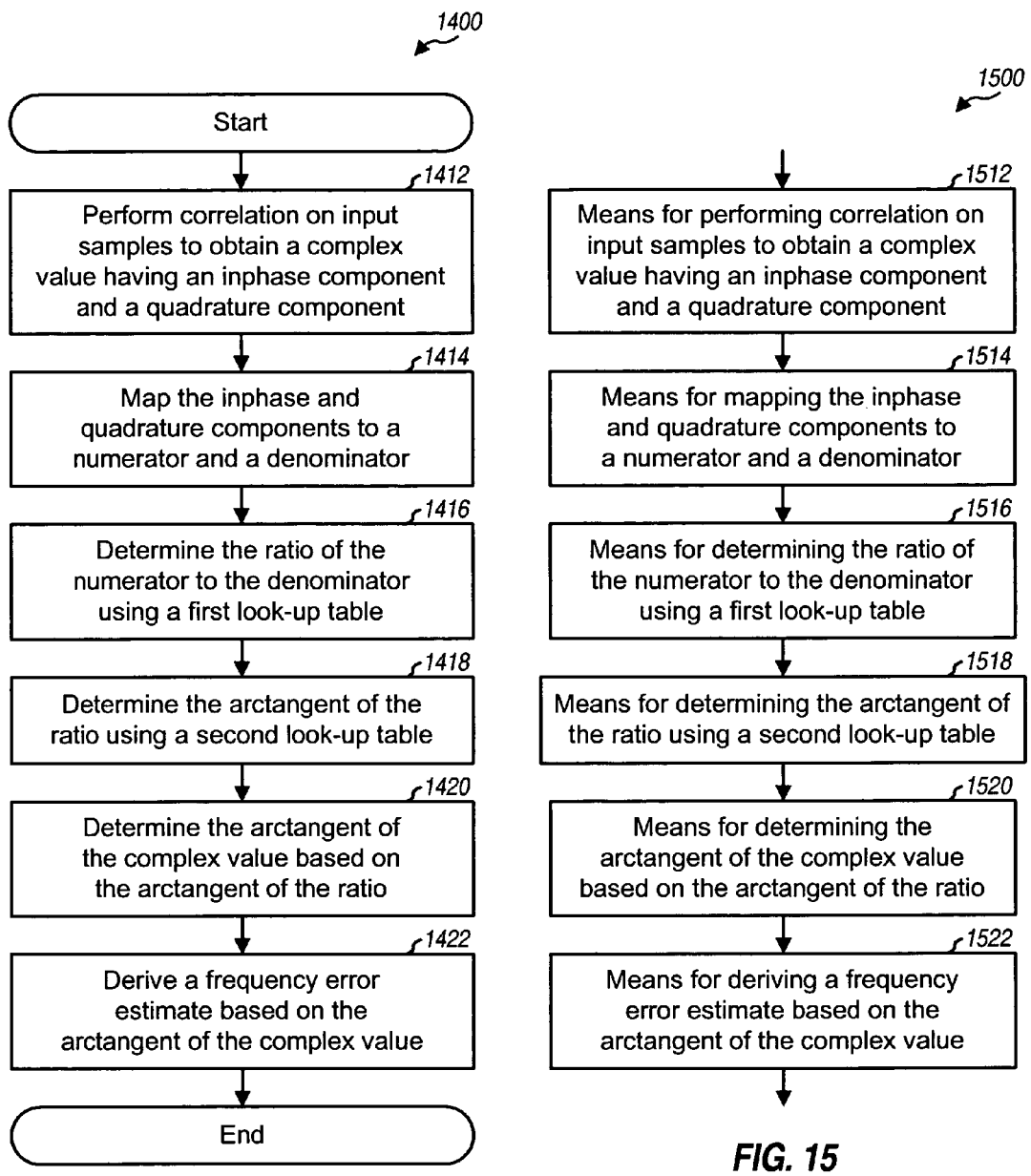
FIGS. 14 and 15 show a process and an apparatus, respectively, for determining an initial frequency error estimate.

FIG. 14 shows an embodiment of a process 1400 for determining an initial frequency error estimate. Correlation is performed on input samples to obtain a correlation result, which is a complex value having an inphase component and a quadrature component (block 1412). The inphase and quadrature components are mapped to a numerator and a denominator, e.g., such that the numerator is less than or equal to the denominator (block 1414). The ratio of the numerator to the denominator is determined using a first look-up table, which may store a table of inverse values (block 1416). The arctangent of the ratio is determined using a second look-up table, which may store a table of arctangent values for a range of 45 degrees (block 1418). The arctangent of the complex value is then determined based on the arctangent of the ratio, e.g., by flipping the phase and/or inverting the sign of the arctangent of the ratio, if needed (block 1420). A frequency error estimate is then derived based on the arctangent of the complex value (block 1422).

FIG. 15 shows an embodiment of an apparatus 1500 for determining an initial frequency error estimate. Apparatus 1500 includes means for performing correlation on input samples to obtain a correlation result, which is a complex value having an inphase component and a quadrature component (block 1512), means for mapping the inphase and quadrature components to a numerator and a denominator (block 1514), means for determining the ratio of the numerator to the denominator using a first look-up table (block 1516), means for determining the arctangent of the ratio using a second look-up table (block 1518), means for determining the arctangent of the complex value based on the arctangent of the ratio (block 1520), and means for deriving a frequency error estimate based on the arctangent of the complex value (block 1522).

Figures 16, 17:
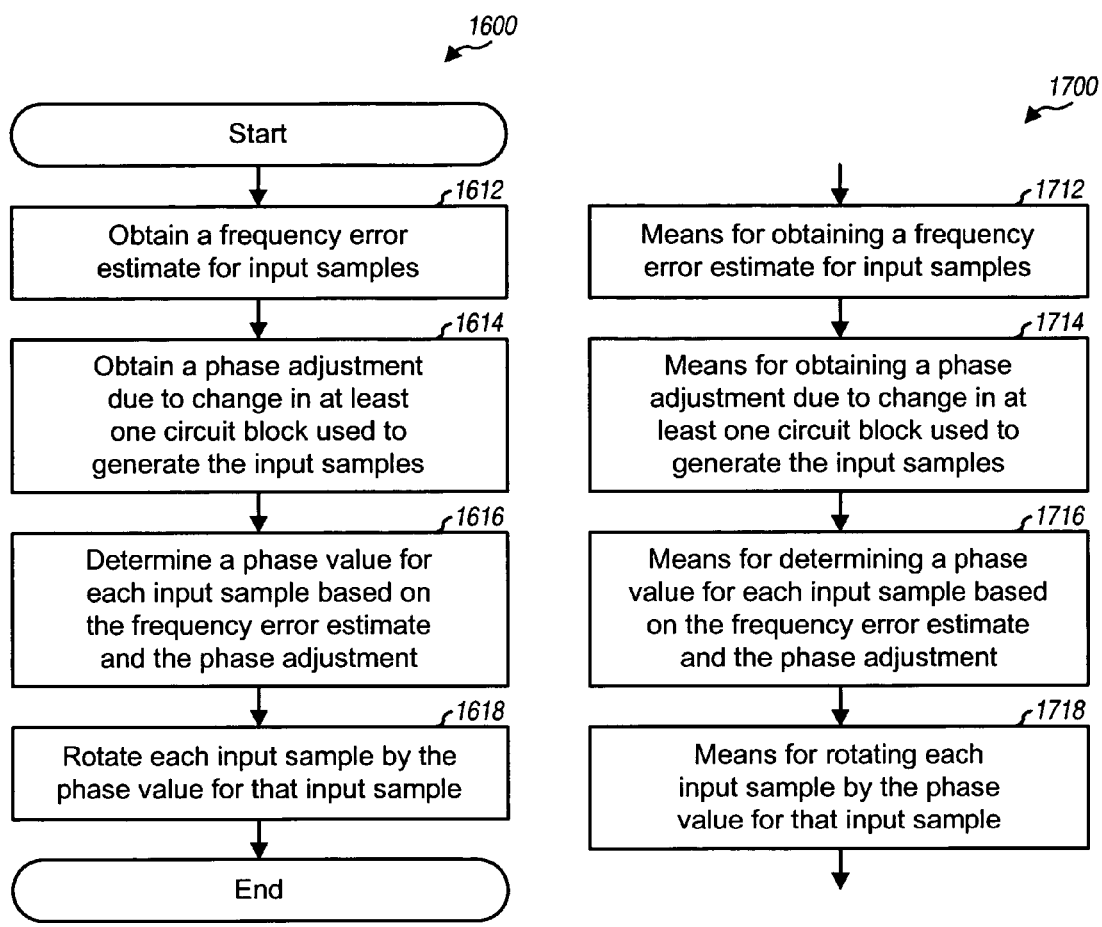
FIGS. 16 and 17 show a process and an apparatus, respectively, for performing frequency control with phase compensation for changes in circuit blocks.

FIG. 16 shows an embodiment of a process 1600 for performing frequency control in a manner to account for phase shift due to changes in circuit blocks. A frequency error estimate for input samples is obtained (block 1612). This frequency error estimate may be derived based on a received pilot, a received OFDM symbol, or some other part of a received signal. A phase adjustment due to change in at least one circuit block used to generate the input samples is also obtained (block 1614). This phase adjustment may be due to a change in the gain setting for the circuit block(s). The frequency error estimate may be accumulated in each sample period. The phase adjustment may be accumulated once when the change in the circuit block(s) occurs. A phase value is determined for each input sample based on the frequency error estimate and the phase adjustment (block 1616). Each input sample is rotated by the phase value for that input sample (block 1618).

FIG. 17 shows an embodiment of an apparatus 1700 for performing frequency control with phase compensation. Apparatus 1700 includes means for obtaining a frequency error estimate for input samples (block 1712), means for obtaining a phase adjustment due to change in at least one circuit block used to generate the input samples (block 1714), means for determining a phase value for each input sample based on the frequency error estimate and the phase adjustment (block 1716), and means for rotating each input sample by the phase value for that input sample (block 1718).

The frequency control techniques described herein may be implemented by various means. For example, these techniques may be implemented in hardware, firmware, software, or a combination thereof. For a hardware implementation, the processing units used for frequency control may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 182 in FIG. 1) and executed by a processor (e.g., processor 180). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
   at least one processor configured to perform frequency acquisition based on a time division multiplexed (TDM) received pilot and to perform frequency tracking based on received Orthogonal Frequency Division Multiplex (OFDM) symbols;
   a memory coupled to the at least one processor; and
   wherein the at least one processor is further configured to process the TDM received pilot by:
   providing a plurality of input samples to a delay line that delays each input sample by a plurality of sample periods corresponding to a length of a pilot sequence;
   producing a complex conjugate of each delayed sample from the delay line;
   multiplying each delayed sample with the complex conjugate;
   peak detecting an output of the multiplying to detect the TDM received pilot and to provide a sample index for a start of a first pilot sequence; and
   accumulating the output of the multiplying over the plurality of sample periods corresponding to the length of the pilot sequence to provide a correlation result for each pilot sequence based on the sample index provided by the peak detecting.

2. The apparatus of claim 1, wherein the at least one processor is further configured to derive an initial frequency error estimate based on the received pilot, to derive a frequency error estimate for each received OFDM symbol, and to correct frequency error in input samples based on the initial frequency error estimate and the frequency error estimate for each received OFDM symbol.

3. The apparatus of claim 1, wherein the at least one processor is further configured to derive an initial frequency error estimate based on the received pilot, and to initialize an automatic frequency control (AFC) loop with the initial frequency error estimate.

4. The apparatus of claim 3, wherein the at least one processor is further configured to derive a frequency error estimate for each received OFDM symbol and to update the AFC loop with the frequency error estimate.

5. The apparatus of claim 1, wherein the received pilot comprises a plurality of pilot sequences, and wherein the at least one processor is further configured to derive an initial frequency error estimate by performing delayed correlation on the plurality of pilot sequences.

6. The apparatus of claim 1, wherein the at least one processor is further configured to derive a frequency error estimate for each received OFDM symbol by performing delayed correlation between samples for the cyclic prefix and samples for a data portion of the received OFDM symbol.

7. The apparatus of claim 1, wherein the processor is further configured to accumulate results of the multiplying using a summer and a register for a plurality of pilot sequences to provide an accumulated result whose arctangent is scaled to provide an initial frequency error estimate.

8. The apparatus of claim 1, wherein the processor is further configured to accumulate for a plurality of pilot sequences the correlation result provided by the accumulating.

9. A processor, comprising:
   a first processing unit configured to perform frequency acquisition based on a time division multiplexed (TDM) received pilot;
   a second processing unit configured to perform frequency tracking based on received Orthogonal Frequency Division Multiplex (OFDM) symbols; and
   wherein the first processing unit is further configured to process the TDM received pilot by:
   providing a plurality of input samples to a delay line that delays each input sample by a plurality of sample periods corresponding to a length of a pilot sequence;
   producing a complex conjugate of each delayed sample from the delay line;
   multiplying each delayed sample with the complex conjugate;
   peak detecting an output of the multiplying to detect the TDM received pilot and to provide a sample index for a start of a first pilot sequence; and
   accumulating the output of the multiplying over the plurality of sample periods corresponding to the length of the pilot sequence to provide a correlation result for each pilot sequence based on the sample index provided by the peak detecting.

10. The processor of claim 9, wherein the first processing unit is further configured to derive an initial frequency error estimate based on the received pilot, wherein the second processing unit is further configured to derive a frequency error estimate for each received OFDM symbol, and further comprising a third processing unit configured to correct frequency error in input samples based on the initial frequency error estimate and the frequency error estimate for each received OFDM symbol.

11. The processor of claim 9, wherein the first processing unit is further configured to derive an initial frequency error estimate based on the received pilot, and to initialize an automatic frequency control (AFC) loop with the initial frequency error estimate.

12. The processor of claim 11, wherein the second processing unit is further configured to derive a frequency error estimate for each received OFDM symbol and to update the AFC loop with the frequency error estimate.

13. The processor of claim 9, wherein the received pilot comprises a plurality of pilot sequences, and wherein the first processing unit is further configured to derive an initial frequency error estimate by performing delayed correlation on the plurality of pilot sequences.

14. The processor of claim 9, wherein the second processing unit is further configured to derive a frequency error estimate for each received OFDM symbol by performing delayed correlation between samples for the cyclic prefix and samples for a data portion of the received OFDM symbol.

15. The processor of claim 9, further comprising a third processing unit configured to accumulate results of the multiplying using a summer and a register for a plurality of pilot sequences to provide an accumulated result whose arctangent is scaled to provide an initial frequency error estimate.

16. The processor of claim 9, further comprising a third processing unit configured to accumulate for a plurality of pilot sequences the correlation result provided by the accumulating.

17. A method, comprising:
   performing frequency acquisition based on a time division multiplexed (TDM) received pilot by:
   providing a plurality of input samples to a delay line that delays each input sample by a plurality of sample periods corresponding to a length of a pilot sequence;

producing a complex conjugate of each delayed sample from the delay line;
multiplying each delayed sample with the complex conjugate;
peak detecting an output of the multiplying to detect the TDM received pilot and to provide a sample index for a start of a first pilot sequence; and
accumulating the output of the multiplying over the plurality of sample periods corresponding to the length of the pilot sequence to provide a correlation result for each pilot sequence based on the sample index provided by the peak detecting; and
performing frequency tracking based on received Orthogonal Frequency Division Multiplex (OFDM) symbols.

18. The method of claim 17, further comprising:
deriving an initial frequency error estimate based on the received pilot;
deriving a frequency error estimate for each received OFDM symbol; and
correcting frequency error in input samples based on the initial frequency error estimate and the frequency error estimate for each received OFDM symbol.

19. The method of claim 17, further comprising:
deriving an initial frequency error estimate based on the received pilot; and
initializing an automatic frequency control (AFC) loop with the initial frequency error estimate.

20. The method of claim 19, further comprising:
deriving a frequency error estimate for each received OFDM symbol; and
updating the AFC loop with the frequency error estimate.

21. The method of claim 17, wherein the received pilot comprises a plurality of pilot sequences, and further comprising deriving an initial frequency error estimate by performing delayed correlation on the plurality of pilot sequences.

22. The method of claim 17, further comprising deriving a frequency error estimate for each received OFDM symbol by performing delayed correlation between samples for the cyclic prefix and samples for a data portion of the received OFDM symbol.

23. The method of claim 17, further comprising accumulating results of the multiplying using a summer and a register for a plurality of pilot sequences to provide an accumulated result whose arctangent is scaled to provide an initial frequency error estimate.

24. The method of claim 17, further comprising accumulating for a plurality of pilot sequences the correlation result provided by the accumulating.

25. An apparatus, comprising:
means for performing frequency acquisition based on a time division multiplexed (TDM) received pilot including:
means for providing a plurality of input samples to a delay line that delays each input sample by a plurality of sample periods corresponding to a length of a pilot sequence;
means for producing a complex conjugate of each delayed sample from the delay line;
means for multiplying each delayed sample with the complex conjugate;
means for peak detecting an output of the multiplying to detect the TDM pilot and to provide a sample index for a start of a first pilot sequence; and
means for accumulating the output of the multiplying over the plurality of sample periods corresponding to the length of the pilot sequence to provide a correlation result for each pilot sequence based on the sample index provided by the means for peak detecting; and
means for performing frequency tracking based on received Orthogonal Frequency Division Multiplex (OFDM) symbols.

26. The apparatus of claim 25, further comprising:
means for deriving an initial frequency error estimate based on the received pilot;
means for deriving a frequency error estimate for each received OFDM symbol; and
means for correcting frequency error in input samples based on the initial frequency error estimate and the frequency error estimate for each received OFDM symbol.

27. The apparatus of claim 25, further comprising:
means for deriving an initial frequency error estimate based on the received pilot; and
means for initializing an automatic frequency control (AFC) loop with the initial frequency error estimate.

28. The apparatus of claim 27, further comprising:
means for deriving a frequency error estimate for each received OFDM symbol; and
means for updating the AFC loop with the frequency error estimate.

29. The apparatus of claim 25, wherein the received pilot comprises a plurality of pilot sequences, and further comprising means for deriving an initial frequency error estimate by performing delayed correlation on the plurality of pilot sequences.

30. The apparatus of claim 25, further comprising means for deriving a frequency error estimate for each received OFDM symbol by performing delayed correlation between samples for the cyclic prefix and samples for a data portion of the received OFDM symbol.

31. The apparatus of claim 25, further comprising means for accumulating results of the multiplying using a summer and a register for a plurality of pilot sequences to provide an accumulated result whose arctangent is scaled to provide an initial frequency error estimate.

32. The apparatus of claim 25, further comprising means for accumulating for a plurality of pilot sequences the correlation result provided by the means for accumulating.

33. A computer-readable medium encoded with a computer program, comprising:
at least one code executable by a computer to perform frequency acquisition based on a time division multiplexed (TDM) received pilot including:
at least one code executable by the computer to provide a plurality of input samples to a delay line that delays each input sample by a plurality of sample periods corresponding to a length of a pilot sequence;
at least one code executable by the computer to produce a complex conjugate of each delayed sample from the delay line;
at least one code executable by the computer to multiply each delayed sample with the complex conjugate;
at least one code executable by the computer to peak detect an output of the multiplying to detect the TDM pilot and to provide a sample index for a start of a first pilot sequence; and
at least one code executable by the computer to accumulate the output of the multiplying over the plurality of sample periods corresponding to the length of the pilot sequence to provide a correlation result for each pilot sequence based on the sample index provided by the peak detecting; and at least one code executable by the computer to perform frequency tracking based on received Orthogonal Frequency Division Multiplex (OFDM) symbols.

34. The computer-readable medium of claim 33, further comprising:
at least one code executable by the computer to derive an initial frequency error estimate based on the received pilot;
at least one code executable by the computer to derive a frequency error estimate for each received OFDM symbol; and
at least one code executable by the computer to correct frequency error in input samples based on the initial frequency error estimate and the frequency error estimate for each received OFDM symbol.

35. The computer-readable medium of claim 33, further comprising:
at least one code executable by the computer to derive an initial frequency error estimate based on the received pilot; and
at least one code executable by the computer to initialize an automatic frequency control (AFC) loop with the initial frequency error estimate.

36. The computer-readable medium of claim 35, further comprising:
at least one code executable by the computer to derive a frequency error estimate for each received OFDM symbol; and
at least one code executable by the computer to update the AFC loop with the frequency error estimate.

37. The computer-readable medium of claim 33, wherein the received pilot comprises a plurality of pilot sequences, and further comprising at least one code executable by the computer to derive an initial frequency error estimate by performing delayed correlation on the plurality of pilot sequences.

38. The computer-readable medium of claim 33, further comprising at least one code executable by the computer to derive a frequency error estimate for each received OFDM symbol by performing delayed correlation between samples for the cyclic prefix and samples for a data portion of the received OFDM symbol.

39. The computer-readable medium of claim 33, further comprising at least one code executable by the computer to accumulate results of the multiplying using a summer and a register for a plurality of pilot sequences to provide an accumulated result whose arctangent is scaled to provide an initial frequency error estimate.

40. The computer-readable medium of claim 33, further comprising at least one code executable by the computer to accumulate for a plurality of pilot sequences the correlation result provided by the accumulating.

* * * * *